Sept. 3, 1957 D. W. SHERMAN 2,804,962
APPARATUS FOR AUTOMATICALLY FABRICATING VEHICLE FRAMES
Filed Sept. 12, 1955 3 Sheets-Sheet 2
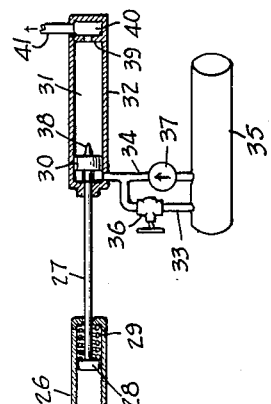
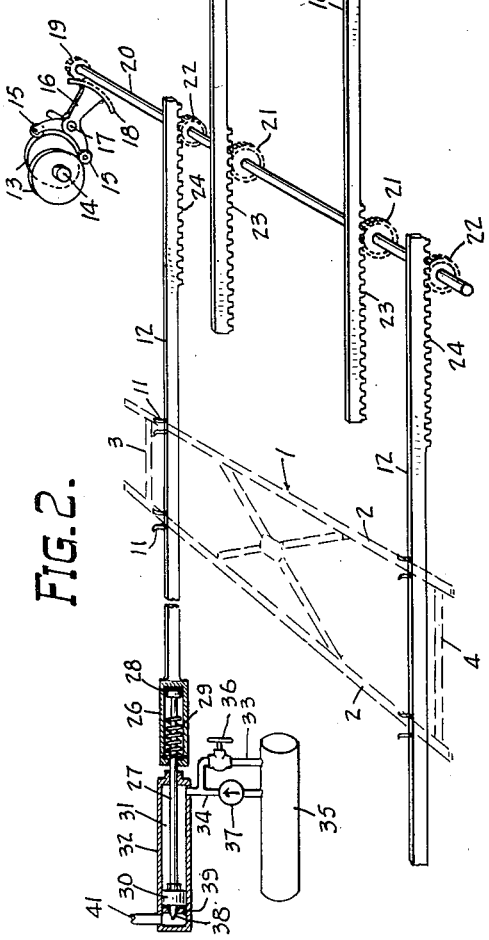
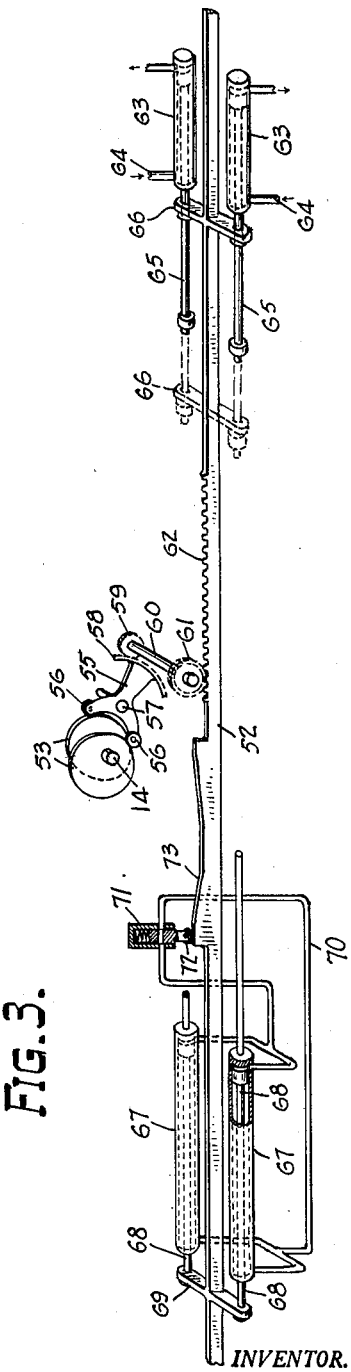
FIG. 2.
FIG. 3.
INVENTOR.
Donald W. Sherman
BY
Andrus & Scales
ATTORNEYS.

Sept. 3, 1957   D. W. SHERMAN   2,804,962
APPARATUS FOR AUTOMATICALLY FABRICATING VEHICLE FRAMES
Filed Sept. 12, 1955   3 Sheets-Sheet 3
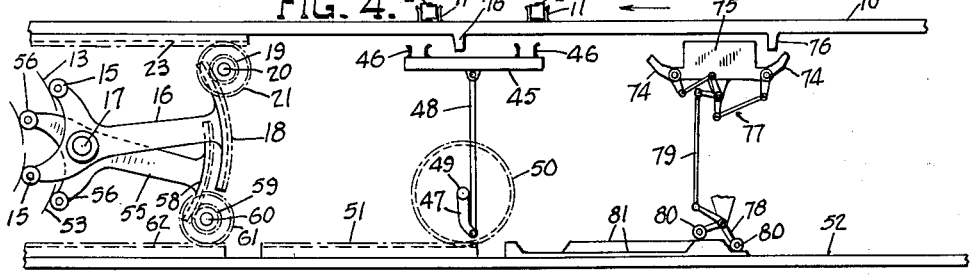
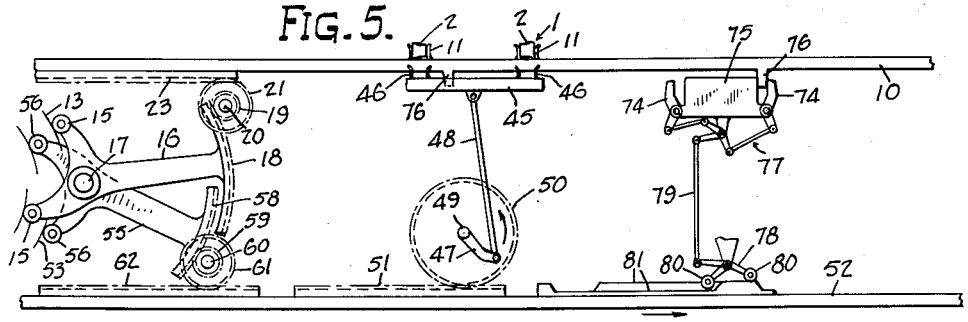
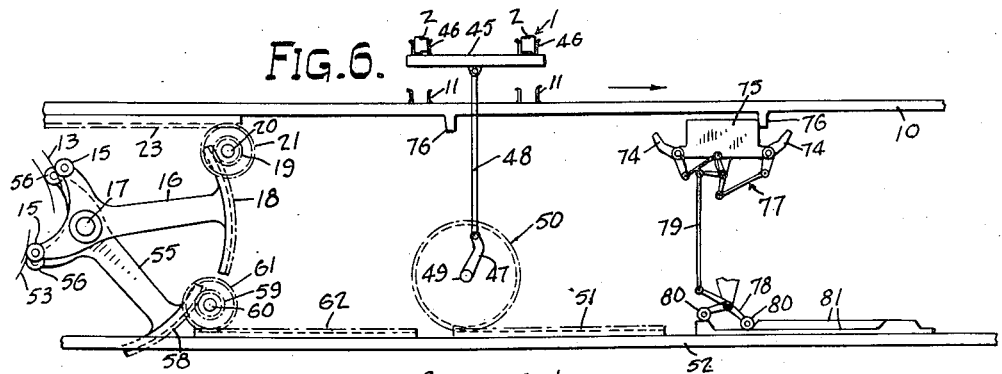
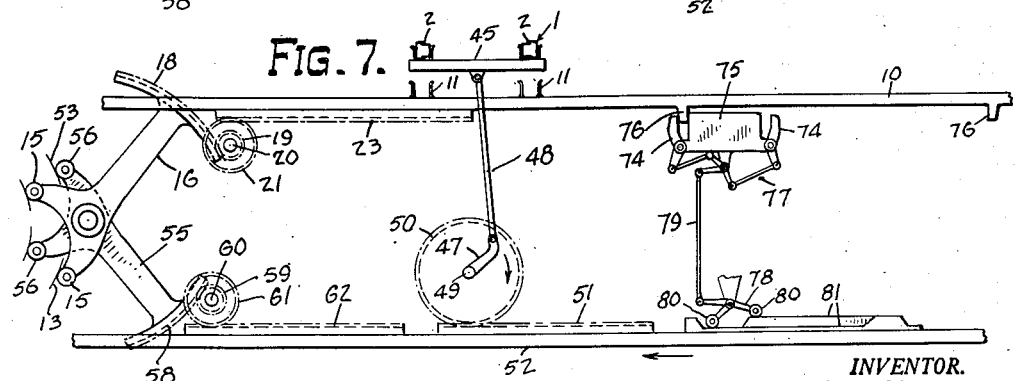
INVENTOR.
Donald W. Sherman
BY
Andrus & Scales
ATTORNEYS.

United States Patent Office 2,804,962
Patented Sept. 3, 1957

2,804,962

APPARATUS FOR AUTOMATICALLY FABRICATING VEHICLE FRAMES

Donald W. Sherman, Milwaukee, Wis., assignor to A. O. Smith Corporation, Milwaukee, Wis., a corporation of New York Application September 12, 1955, Serial No. 533,759

15 Claims. (Cl. 198—19)

This invention relates to apparatus for automatically fabricating or assembling vehicle frames.

A vehicle frame generally consists of a pair of side rails which extend the length of the frame and which are connected by a motor mount, cross members, and an end bar. The side rails of the frame, which generally have a channel or box-shaped cross section, are formed of sheet metal by a series of shearing, blanking and piercing operations. The cross members, motor mounts, body brackets and other members of the frame are similarly formed in independent lines, and these elements and the side rails are brought together at the main assembly line where the component parts are joined together to form the completed frame.

The assembly line for the frame consists generally of a series of work stations where particular operations are employed in the assembly of the frame. For example, at one station the body brackets are welded to the side rails, at another station the motor mounts and cross members are attached to the side rails by rivets, at other stations the rivets are nailed, welding of the seams of the side rails is accomplished at other stations, and straightening and gauging operations are performed at still other stations to complete the assembly.

In the usual type of assembly line, the frame elements are secured to a movable carriage by a series of clamps and the carriage is moved longitudinally to each work station where a specific operation in the assembly process is performed. The difficulty with this type of assembly line is the excessive length of the line due to the fact that the frames are moved lengthwise along the line. In order to achieve economies in the building structure which houses the line, the assembly line is usually doubled back rather than being one continuous straight line and the doubling back results in a loss of work stations at the areas of turning. In addition, the transferring of the frames lengthwise requires a stroke of at least 18 feet to position the frames at each succeeding work station and this long stroke presents added difficulties in the construction of the drive mechanism.

The present invention is directed to apparatus for assembling vehicle frames in which the frames are moved laterally to position each frame at a series of work stations. According to the invention an upper level or platform is provided with a series of spaced aligned openings which serve as work stations. The area between adjacent openings or work stations defines an access area in which the workmen stand and perform the particular operation on the frame at the work stations.

The frames to be assembled are conveyed laterally within a chamber beneath the upper level on a pair of transfer beams. The transfer beams are provided with a reciprocating stroke sufficient in length to successively convey each frame from a position beneath a work station to a position beneath the next succeeding work station. A lifting unit is associated with each work station and serves to lift the frame from the transfer beams and elevate the same to the work station where an operation in the assembly is performed on the frame. During the working operation, with the frame resting on the lifter, the transfer beam is moved in a return stroke and on completion of the working operation the lifter unit lowers the frame onto the transfer beams and the transfer beams then move forwardly to position the frame beneath the next succeeding working station. This transfer and lifting operation is repeated throughout the length of the assembly line until the assembly of the frame has been completed.

As the frames are moved laterally in the present assembly line, the on-center distance between work stations is substantially reduced over a system in which the frames are moved longitudinally. This reduction in the on-center distance between work stations not only decreases the total length of the assembly line but also decreases the stroke of the transfer beams. By decreasing the stroke of the transfer beams the drive mechanism for the transfer beams can be greatly simplified.

Similarly, as the on-center distance is reduced, the time, velocity, and accelerations required to transfer the frames from one work station to the next are correspondingly reduced. As the transfer beams are returned to their original position during the time when the frame is at the work station, there is no time lost for the return stroke of the transfer beams.

With the present system of elevating the frame to the work station, the workmen can see the frame moving upwardly toward them and can be prepared for the working operation. In addition, the workmen are not required to move out of position when the frame is brought to the work station or removed therefrom in order to avoid the path of movement of the frame. This reduces the amount of waste motion of the workmen and substantially speeds up the working operation. Furthermore, as the frame is removed downwardly from the work station, it eliminates the danger of workmen being in the path of movement of the frame as the same is moved from the work station.

The drawings furnished herewith illustrate the best mode of carrying out the invention as presently contemplated and set forth hereinafter.

In the drawings:

Fig. 2 is a diagrammatic showing of the drive mechanism for the transfer beams;

Fig. 3 is a diagrammatic showing of the drive mechanism for the lifter units;

Fig. 4 is a diagrammatic showing of the operation of the positive stop for the transfer beams in which the beam is approaching the end point of its stroke;

Fig. 5 is a view similar to Fig. 4 showing the transfer beam locked in position and the lifter unit beginning to move upwardly;

Fig. 6 is a view similar to Fig. 4 showing the frame lifted by the lifter unit into the working position and the transfer beam being unlocked; and Fig. 7 is a view similar to Fig. 4 showing the frame being lowered and the transfer beam being locked.

Figure 1:
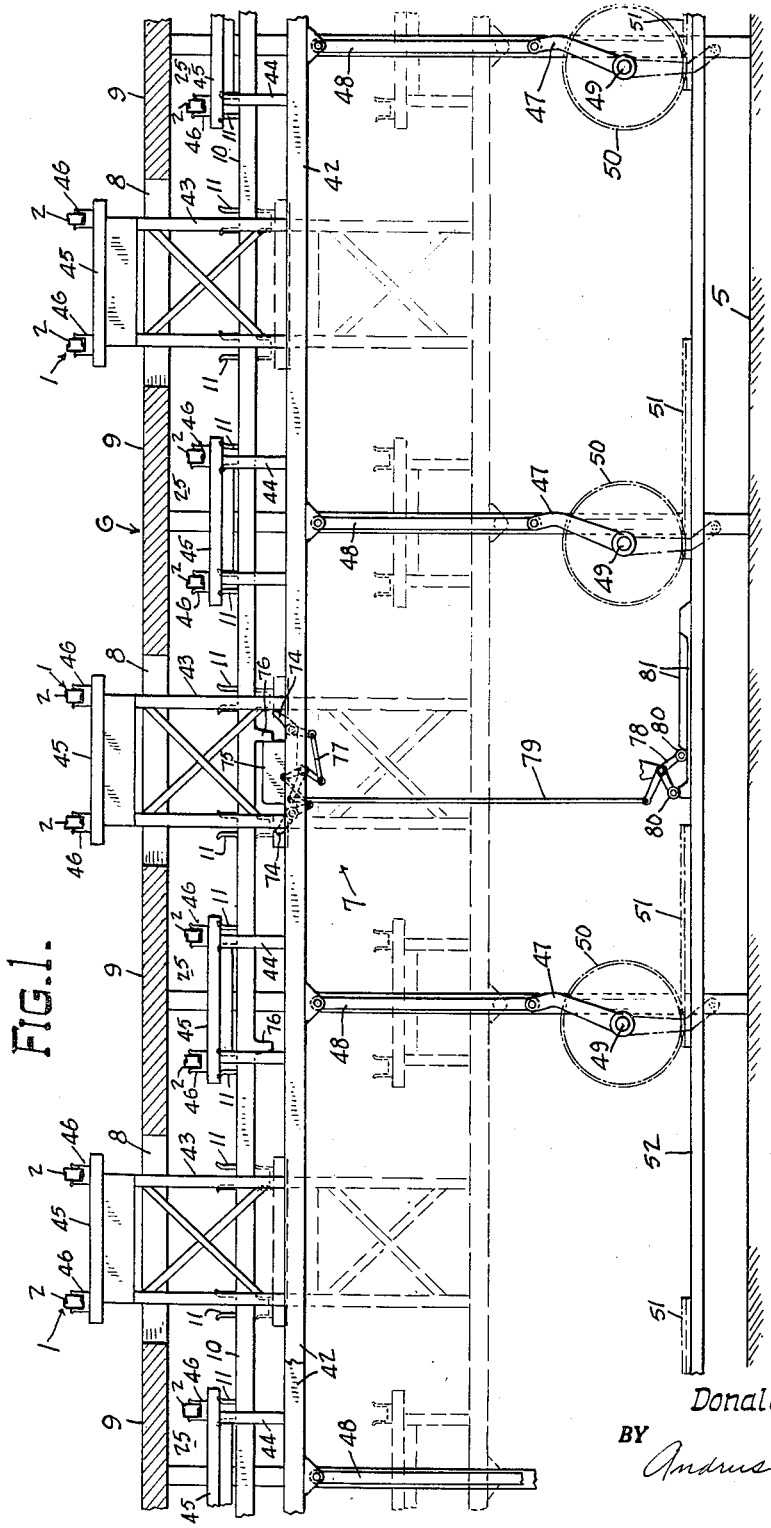
Figure 1 is a diagrammatic fragmentary vertical section of the assembly line of the present invention.

The drawings illustrate an apparatus for the conveying and transferring of vehicle frames 1 during the assembly thereof. The vehicle frame 1 generally is formed of a pair of side rails 2 which extend the length of the frame and are connected at the front end portion by a motor mount 3 and at the rear end portion by an end bar 4.

The side rails 2 are formed of an inner rail and an outer rail which have generally channel-shaped cross sections and are joined together to provide the side rail with a generally box-shaped cross section.

The individual elements of the frame 1, namely the inner and outer rails of the side rail 2, the motor mount 3 and the end bar 4, are each formed from sheet metal stock by a series of shearing, blanking and piercing operations in separate production lines. The completed elements are then brought together and assembled to form the frame by a number of working operations performed successively at a series of work stations. The present invention is directed to an apparatus for automatically conveying the frames from one work station to the next succeeding station and for locating the frame in position for the working operation to be performed thereon by raising it into working position from below.

As best shown in Figure 1, the apparatus comprises a foundation 5 which supports the conveying mechanism and an upper level 6 or platform which is spaced upwardly from foundation 5 to provide a chamber 7 therebetween.

The level 6 is provided with a series of spaced, generally rectangular openings 8 which define work stations and a specific operation in the assembly of the frame is performed at each of the work stations.

The openings or work stations 8, being rectangular in shape, conform generally to the size of the frames 1 and the lateral or short dimension of the work stations are disposed in alignment.

The portions of level 6 extending between adjacent work stations 8, indicated by 9, define access areas for workmen who perform the working operations at the adjacent work stations or for mechanical processing devices. The workmen standing on areas 9 perform a specific operation on the frame, such as welding, riveting, gauging, etc. when the frame is conveyed to and positioned at the work station.

The frames 1 are conveyed within chamber 7 and successively positioned beneath each of the work stations by a transfer mechanism which is supported by the foundation 5. A lifting unit is associated with each of the work stations and serves to lift the frames from the transfer mechanism, elevate the same to the work station, and to lower the frame back down onto the transfer mechanism after the working operation has been performed at the work station and the transfer structure has meanwhile returned to the original position.

The transfer mechanism comprises a pair of spaced beams 10 which extend longitudinally of the assembly line beneath the series of work stations 8. To support the frames on the transfer beams 10, the beams are provided with a plurality of generally U-shaped forks 11 which receive the side rails of the frame and position the frame with respect to the beams as the beams are moved with reciprocating motion.

As the assembly line consists of perhaps 40 work stations and may have a length up to 600 or 700 feet, the beams 10 extend approximately one-half the length of the line and a second pair of transfer beams 12, similar in structure and function to beams 10, are employed for the second half of the length of the line. The drive mechanism for the beams is placed approximately in the center of the line.

The transfer beams 10 and 12 are moved in a reciprocating path to convey the supported frames from one work station to the next by a drive mechanism which comprises a pair of cams 13 which are secured to cam shaft 14. This is best shown in Fig. 2. The cam shaft 14 is driven by a suitable motor and speed reducing mechanism, not shown.

A pair of cam followers 15 are rotatably secured to rocker arm 16 and each of the followers 15 is adapted to engage and ride on the surface of one of the cams 13. The rocker arm 16 is fulcrumed to a pin 17 and carries a gear quandrant 18 which meshes with a gear 19 keyed to shaft 20. With this construction the rocker arm 16 pivots as the followers 15 ride on the cams 13 to thereby rotate gear 18 and drive shaft 20.

The shaft 20 carries a pair of gears 21 and a pair of gears 22 which engage racks 23 and 24 on the lower surfaces of beams 10 and 12, respectively. Rotation of shaft 20 is thus imparted through the gears 21 and 22 and racks 23 and 24 to move the transfer beams in straight line motion. By having gears 21 of a different size than gears 22, the stroke of the respective beams 10 and 12 can be varied for a given degree of pivotal movement of the rocker arm 16.

By proper selection of the cam surfaces 13, the transfer beams are provided with a cycle which consists of a period of comparatively rapid forward movement to position the frames at the next succeeding station in the assembly line, a period of dwell during which there is no movement of the transfer beams and during which the lifter units act to elevate the frames from the transfer beams to the work stations 8, a period of comparatively slow return movement during which the transfer beams are returned to their original position, and a second period of dwell during which the transfer beams are stationary and the lifter units lower the frames back onto the transfer beams.

In order to shorten the stroke of the transfer beams and thus increase the speed of the assembly, a series of sleeper stations 25 are provided in the chamber 7 beneath the access areas 9. The forward stroke of the transfer beams can thus be made equal to one-half, one-third, one-quarter, etc., of the distance between adjacent work stations 8 or equal to the distance between a work station and the adjacent sleeper station. By decreasing the stroke of the transfer beams 10 and 12, the time required for the stroke, as well as the dynamic requirements, are correspondingly reduced and thus the overall time of assembly is reduced.

The forces bringing about the reciprocating movement of transfer beams 10 and 12 are boosted and cushioned by a system comprising spring housings 26 which are secured to the outer ends of each of the transfer beams 10 and 12. Piston rods 27 carry plungers 28 which are slidably disposed within the spring housings 26 and springs 29, interposed between plungers 28 and the ends of housings 26, urge the rods 27 inwardly of the housing.

The opposite end of each rod 27 carries a plunger 30 which is slidably disposed within chamber 31 of air cylinder 32.

A closed air system is connected to chamber 31 and includes a pair of conduits 33 and 34 which provide communication between chamber 31 and an air pressure tank 35. The flow of air through conduit 33 toward the tank is controlled by an adjustable bleeder valve 36 while a check valve 37 permits flow of air from tank 35 to chamber 31 through conduit 34 but restricts the flow of air in the opposite direction.

The rear end of rod 27 projects beyond plunger 30 to provide a pilot 38 which is adapted to register with an opening in a baffle plate 39 to provide a cushioned seat for the plunger 30. The baffle 39 separates chamber 31 from an outlet chamber 40 which is open to the atmosphere through vent 41.

With this construction, as the transfer beams 10 are moved forwardly, to the left in Fig. 2, each of the spring housings 26 associated with beams 10 moves forwardly with respect to rod 27 and the rearward end of the housing engages spring 29. When beams 10 have moved through about one-half of their stroke the spring 29 is fully compressed and movement of the beams 10 then draws rod 27 outwardly of cylinder 32 forcing air within chamber 31 through conduit 33 to tank 35. The restricted opening in bleeder valve 36 in conduit 33 tends to limit the flow of air, builds up pressure ahead of plunger 30, thus opposing the movement of plunger 30 within chamber 31, and cushioning the latter half of the stroke of transfer beams 10 and also the latter half of the stroke of beams 12 which are connected to beams 10 through shaft 20.

While the air system associated with beams 10 serves to cushion the action of the transfer beams 10 and 12 on the latter half of the forward stroke, the air system associated with the beams 12 serves to boost or aid said movement of the transfer beams 10 and 12 during the first half of the forward stroke, by virtue of the air pressure from tank 35.

When the beams 12 are moved forwardly with beams 10, air under pressure in the tank 25, associated with beams 12 passes through check valve 37 in conduit 34 circumventing bleeder valve 36 and exerts a force on plunger 30 which acts in conjunction with the forward movement of beams 12 to aid the drive in the movement of the beams. The air under pressure forces plunger 30 inwardly, to the left in Fig. 2, and thereby draws rod 27 inwardly of the cylinder 32 to pull beams 12 forwardly and correspondingly exert a forward pull on beams 10 which are connected to beams 12 through shaft 20. The spring 29 is fully compressed during this action.

When beams 12 have moved through approximately one-half of their stroke, plunger 30 seats against baffle 39 to cut off the booster action. When this occurs each of the spring housings 26, attached to beams 12, move relatively to rod 27 until the beams 12 reach the end point of the forward stroke. At the forward limit of the stroke of beams 12, the plungers 28 are spaced slightly out of contact with the ends of the respective spring housings 26.

On the return stroke the procedure is reversed with the air system associated with beams 10 tending to boost the first half of the stroke and the air system of beams 12 tending to cushion the latter half of the stroke.

The lifting units which elevate the frames 1 from the transfer beams 10 and 12 to the work stations 8 include a pair of lifter beams 42 which are disposed in spaced relation and extend the length of the assembly line. The lifter beams 42 support a series of lifting frames 43, which are vertically aligned with work stations 8, and a series of smaller lifting frames 44 which are vertically aligned with the sleeper stations 25. The lifter frames 43 and 44 are aligned between the pairs of transfer beams 10 and 12 and are adapted to move between the transfer beams as the lifter beams are raised and lowered. Each of the lifting frames 43 and 44 supports a platform 45 which carries a plurality of forks 46 that are adapted to engage the side rails 2 of the frame being lifted. The forks 46 may take a generally U-shaped form, as shown in the drawings, or they may consist of pneumatically or mechanically, etc., operated clamps which positively grip the frame and position the same with respect to the platform.

At the lowermost position of the lifter beams 42, the platforms 45 associated with both the larger and smaller lifter frames 43 and 44 are disposed beneath the level of the transfer beams 10 and 12. As the lifter beams 42 are raised, the platforms move upwardly and lift the frames from the transfer beams. The vehicle frames 1 carried on the platform 45 associated with lifter frames 43 are elevated into the work stations 8 where a specific operation in the assembly process is performed on the frame, while the frames carried on the platforms associated with the lifter frames 44 are merely elevated above the transfer beams to sleeper stations 25 so that the transfer beams can be returned to their original position. After completion of the working operation the lifter beams 42 are lowered and the frames 1 carried on platforms 45 are deposited on the transfer beams 10 and 12 in preparation for a subsequent incremental movement to the next succeeding station.

The lifter beams 42 are raised and lowered by a plurality of cranks 47 which are connected to the lifter beams by arms 48. Cranks 47 are secured to shafts 49 which carry gears 50. Each gear 50 meshes with a rack section 51 secured to reciprocating drive beam 52. Movement of drive beam 52 and rack 51 in one direction rotates gears 50 and shafts 49 and thereby pivots crank 47 upwardly to raise the lifter beams. Conversely, movement of the drive beam 52 in the opposite direction pivots the cranks to lower the lifter beams.

The mechanism for reciprocating the drive beam 52 is similar to the mechanism for driving the transfer beams and includes a pair of cams 53 which are mounted on cam shaft 14 to assure exact timing of transfer and lifter movements. A rocker arm 55 carries a pair of cam followers 56, each of which rides on the surface of one of cams 53. Rocker arm 55 is fulcrumed on shaft 57 and carries a gear segment 58 which meshes with gear 59 mounted on shaft 60. Shaft 60 carries a gear 61 which meshes with a rack 62 on the drive beam 52. Rotation of cams 53 pivots rocker arm 55 to drive the shaft 60 and thereby move drive beams 52 in a straight-line path. As in the case of the transfer beam cams, the surfaces of cams 53 are designed so that a cycle is provided which consists of a period of dwell, coinciding with the forward stroke of the transfer beams, a period of forward movement of the drive beam to elevate the frame from the transfer beams and beginning shortly before the transfer beams finish the forward stroke, a second period of dwell during which a working operation is performed on the frame, and a period of return movement of the drive beam to lower the frame back onto the transfer beams.

The dead weight of the lifter beams and the members carried thereby may be balanced by a series of balancing cylinders, not shown, so that the drive mechanism need only overcome the dynamic loads.

Due to the magnitude of the dynamic loads involved a booster device may be employed in conjunction with the lifter drive mechanism to the lifter beams 52. The booster device, as shown in Fig. 3, comprises a pair of air cylinders 63 which are connected to a source of high pressure fluid, not shown, by conduits 64. A piston is slidably disposed within each cylinder 63, and carries a piston rod 65 which is slidable in a crosshead 66 that is secured to the drive beam 52. The operation of cylinders 63 is synchronized with the mechanical drive so that compressed air is introduced into cylinders 63 to retract the piston rods during the first portion of the lifter stroke and the heads on the working ends of rods 65 engage the crosshead 66 to thereby aid the mechanical drive in moving the drive beam 52. The dashed lines in Fig. 3 indicate the position of the piston rods and crosshead at the start of the lifting stroke and the solid lines indicate the position of the members at the end of the lifting stroke. As the stroke of the piston rods 65 is substantially less than the stroke of the beam 52 and crosshead 66, the rods boost the first portion of the stroke of the beam 52 and thereafter the crosshead moves freely with respect to the rods to the end point of the stroke of the beam. A second series of booster devices, not shown, similar to cylinders 63 and installed and acting in the opposite direction may be employed to boost the return stroke of the lifter drive mechanism.

The first series of booster devices, as described above, are employed to aid the first half of the forward stroke of the lifter mechanism while the second series of booster devices serve to cushion the latter half of the forward stroke of the lifter mechanism. On the return stroke of the lifter mechanism the procedure would be reversed.

Any residual oscillations of the drive beam 52 at either end of the stroke are minimized by a pair of hydraulic snubber cylinders 67 having piston and piston rod assemblies 68 which are connected through crosshead 69 to drive beam 52. A closed hydraulic system is provided by conduit 70 which extends externally of the cylinders and provides communication between the opposite ends thereof. The flow of fluid through the conduit 70 is controlled by a spring-biased orifice valve 71 which is operated by a cam follower 72. The follower 72 is adapted to ride on a cam 73 secured to drive beam 52 as the drive beam reciprocates.

As the drive beam 52 moves, the crosshead 69 attached to the drive beam moves correspondingly, to thereby extend or retract piston rods in cylinders 67. As the pistons move toward one end of the cylinders, hydraulic fluid is forced outwardly of that end of the cylinders, through conduit 70 to the opposite ends of the cylinders, and the valve 71 controls the flow of fluid through conduit 70 in accordance with the movement of follower 72 on cam 73. As the drive beam approaches the end point of either the forward or return stroke, follower 72 rides up on the corresponding high end of the cam 73 and the flow of fluid through conduit 70 is restricted to dampen or cushion the movement of the drive beam and thereby minimize any residual oscillations thereof.

To eliminate the above snubbing action at the start of the stroke of the lifter beam, a suitable by-pass conduit and valve may be employed in conjunction with conduit 70 which, when energized by the lifter beam at the end of its stroke, will permit the fluid to pass freely around the valve 71 until the lifter beam has advanced a predetermined distance.

To nullify any inaccuracy in positioning transfer beams 10 and 11 at either end of the stroke, due to elastic deformation and backlash in the drive, a positive stop is provided for the beams.

This stop mechanism is synchronized with the lifter unit drive mechanism and includes a pair of jaws 74 which are pivotally attached to a stop block 75. Each of the jaws 74 is adapted to engage and clamp a projection 76 provided on the under surface of transfer beams 10 and 12.

The jaws 74 are opened and closed in unison by a toggle linkage, indicated generally by 77, which is connected to a rocker arm 78 by a linkage 79. The rocker arm 78 carries a pair of cam followers 80 each of which is adapted to ride on a cam 81 secured to the drive beam 52. As the drive beam reciprocates, the followers 80 ride on the cams 81 and pivot the rocker arm 78 to open and close the jaws 74. As shown in Figs. 4 through 7, the positive stop for the transfer beams is actuated by and synchronized with the movement of the lifter beams. Fig. 4 shows the transfer beams 10 moving in a forward stroke to position the frame 1 beneath a work station 8. During this movement of transfer beams 10, the lifting platforms 45 are disposed at a level beneath the transfer beams and the jaws 74 are in the open position.

As the transfer beams 10 approach the end point of their forward stroke, the drive beam 52 is actuated to move the lifter platform 45 upwardly. Initial movement of the drive beam 52 causes one of the cam followers 80 to ride off of the high end point of cam 81 and pivot rocker arm 78 to close the jaws 74 and clamp the projection 76 between one of the jaws and the stop block 75. This is shown in Fig. 5. The clamping of the projection 76 provides a positive stop for the transfer beams and prevents chattering or shaking of the same.

Further movement of the drive beam 52 pivots cranks 47 to elevate the lifting platform 45 and lift the frame 1 from the transfer beams 10 up to the work station 8.

As the drive beam 52 approaches the end point of its stroke, the second of the followers 80 rides upwardly on the opposite raised end portion of cam 81 to pivot the rocker arm 78 and open the clamping jaws 74. With the jaws 74 open, the transfer beams 10 can then be returned to their original position. This is shown in Fig. 6.

After the working operation is completed at the work station, the drive beam 52 is actuated to lower the lifting platform and the frame from the work station. Initial movement of the drive beam 52 results in the second cam follower 80 moving off of the high end portion of cam 81 to pivot rocker arm 78 and clamp the second of the projections 76 between the jaw 74 and block 75. This is shown in Fig. 7. The transfer beams 10 remain in the locked position until after the frame has been lowered onto the beams 10 and the drive beam 52 approaches the end point of its return stroke. At this time the first follower 80 again rides on the raised end of cam 81 and open jaws 74 to release the transfer beams 10. The transfer beams are then in position to move in the forward stroke to convey the frame to the next succeeding work or sleeper station.

The entire cycle of transferring the frame, elevating the same, working on the frame, and lowering it back on the transfer beams, is accomplished in about 17.5 seconds and to move the frame both horizontally and vertically within this time limit necessitates moving the frame at high velocities involving sizeable acceleration and deacceleration forces. For example, the time required to transfer the frame on the transfer beams 10 from one station to the adjacent station requires only 1.2 seconds, while the time required to lift the frame from the transfer beams to the work station is only 1.2 seconds.

With the present method of assembly, the frames are moved laterally through the series of work stations. By moving the frames laterally rather than lengthwise, a substantial space savings is accomplished which enables the assembly line to be housed in a building of smaller dimension. As the frames move laterally, the on-center distance between work stations is substantially reduced over an assembly line in which the frames are moved longitudinally. This reduction in the on-center distance also decreases the required stroke of the transfer beams and thereby greatly simplifies the drive and supporting mechanism for the transfer beams.

The use of sleeper stations further reduces the required stroke of the transfer beams and the time required to move the frames from one station to the next succeeding station.

As the frame is brought to the work station from beneath, the entire frame, both sides and both ends, are accessible for working operations. This is in contrast to the conventional assembly line in which the frames are moved longitudinally in a given horizontal plane. In this latter system the ends of the frame are relatively non-accessible. In addition processing machinery, such as welding or riveting equipment and the like, can be positioned around the entire work station in the assembly line of the invention without the need of providing a pathway through which the frame is to be moved or conveyed.

As the frames are conveyed or transferred at a lower level and are moved upwardly into the work station, the workmen who are standing on the access areas 9 can see the frame moving upwardly toward them and can be prepared for the particular working operation they are to perform. The workmen do not have to move out of the way to permit the frame to be moved in or out of the work station, and this substantially reduces the amount of waste motion of the workmen and speeds up the working operation.

An important feature of the present line is the fact that the various operations are performed conveniently, without any movement of the operator, or workman, being necessary. The workman stays in the best spot for performing his work on a particular part of the frame. The assembly line of the invention allows this type of fixed position both for the men and the machines.

The present system also has a safety advantage in that the frames are moved downwardly out of the work station and thereby eliminates the danger of workmen being in the path of movement of the frame as the same is moved to or from the work station.

In the ordinary assembly line a model change may require a considerable revision of the line and the processing machinery. In the present line where the transfer and lifter mechanisms are below floor level existing machinery may be changed and any type of processing machinery can be added without interferring with the transfer and lifter machinery.

Because of the fact that the weight of the frame itself serves to hold it in position on the transfer beam and on the lifters, relatively simple holding and gripping devices are required to move the frame from station to station and to lift the frame to the proper working height.

The straight line motion used both in transferring and lifting permits very simple drive machinery and results in very rapid movement of frames and short time delay in transferring frames from station to station.

Various modes of carrying out the invention are contemplated as within the scope of the folowing claims particularly pointing out and distinctly claiming the subject matter which is regarded as the invention.

I claim:

1. An assembly line for fabricating vehicle frames comprising, a floor having a series of spaced openings therein with each of said openings defining a working station whereat a given operation is performed on the vehicle frame, the portion of said floor extending between adjacent openings defining a series of access areas for workmen, a foundation spaced beneath said floor and defining a chamber therebetween, said chamber extending continuously beneath said series of openings, means for conveying the frames within the chamber, and single means for successively and simultaneously elevating each frame at each of said working stations to permit the series of operations to be formed on the frame.

2. An assembly line for fabricating vehicle frames comprising, a supporting structure having a series of spaced openings therein with each of said openings defining a working station whereat one of a series of operations is performed on the frame, the portion of the supporting structure extending between adjacent openings defining a series of spaced access areas for workmen performing said operations, a chamber formed in said supporting structure and extending continuously beneath said openings and disposed in communication with said openings, transfer means disposed within the chamber for moving the vehicle frames therein to successively position each of the frames beneath the openings in said series, and a vertically movable platform synchronized with said transfer means to elevate the frames simultaneously upwardly from said transfer means and position the frames at the corresponding working station and to lower the frames from the working station onto said transfer means after the operation has been completed at said working station.

3. In an assembly line for fabricating vehicle frames comprising, a supporting surface having a series of spaced generally rectangular openings therein with each of said openings defining a working station whereat one of a series of work operations is performed on the frame, said openings having the shorter dimension in alignment and the portion of said surface extending between adjacent openings providing a series of access areas for the workmen performing the operations, a second supporting surface spaced beneath said first supporting surface to provide a chamber therebetween, said chamber extending coextensively with the said series of openings, a conveyor disposed within said chamber and adapted to support a plurality of the frames, means to advance said conveyor in predetermined increments to successively position each frame in vertical alignment with each of said series of openings, and a pair of vertically movable beams adapted to lift the frames simultaneously from the conveyor upwardly to the corresponding working station and to lower the frame from the working station onto the conveyor after the working operation has been completed at that station.

4. An assembly line for fabricating vehicle frames comprising, an upper floor level having a series of spaced openings therein with each of said openings defining a working station and the portion of the floor level extending between adjacent openings defining an access area for workmen, a lower floor level spaced beneath said first floor level to define a passage therebetween, said passage having a series of lifting stations disposed in alignment beneath said working stations and having a plurality of sleeper stations disposed beneath said access areas, means to convey frames within said passage in increments to successively position said frames at said lifting stations and said sleeper stations, and means extending substantially the length of the assembly line and disposed at each lifting station to elevate the frames at each lifting station simultaneously upwardly from the conveyor means to the corresponding working station whereat one of a series of operations is performed on said frame.

5. An assembly line for fabricating vehicle frames comprising, an upper floor level having a series of spaced openings therein with each of said openings defining a working station and the portion of the floor level extending between adjacent openings defining an access area for workmen, a lower floor level spaced beneath said first floor level to define a passage therebetween, said passage having a series of lifting stations disposed in alignment beneath said working stations and having a plurality of sleeper stations disposed beneath said access areas, means to convey a frame within said passage in increments to successively position said frame at said lifting stations and said sleeper stations, and means disposed at each lifting station to elevate the frame at said lifting station upwardly to the corresponding working station whereat one of a series of operations is performed on said frame, and means disposed at each sleeper station to elevate the frame located at that sleeper station upwardly from said conveying means when the adjacent frames are elevated to the working station.

6. An assembly line for fabricating vehicle frames comprising, an upper floor level having a series of spaced openings therein with each of said openings defining a working station and the portion of the floor level extending between adjacent openings defining an access area for workmen, a lower floor level spaced beneath said first floor level to define a passage therebetween, said passage having a series of lifting stations disposed in alignment beneath said working stations and having a plurality of sleeper stations disposed beneath said access areas, a reciprocating conveying member disposed within said passage for moving a series of frames in increments to successively position each frame at said lifting stations and said sleeper stations, a lifting mmeber disposed at each lifting station to elevate the frame located at that lifting station upwardly from the conveying member to the corresponding working station whereat one of a series of operations is performed on said frame and said lifting member acting to lower said frame back onto said conveying member after the said operation is completed, and a second lifting member disposed at each sleeper station and synchronized in operation with said first lifting member, each of said second lifting members acting to elevate the frame located at the respective sleeper station upwardly out of contact with said conveying member to a position beneath the corresponding access area and thereby remove said frames from the conveying member and permit the conveying member to be reciprocated.

7. An assembly line for fabricating vehicle frames, comprising a series of working stations disposed in a generally horizontal plane with adjacent stations in said series being spaced to provide an access area between each pair of adjacent stations, conveyor means disposed in a second plane parallel to said first-named plane for moving the frames in increments to successively position the frames in vertical alignment with said working stations, a drive beam dlisposed in a third plane parallel to said first-named plane and extending longitudinally of said series of working stations, drive means for moving the drive beam in a reciprocating path, a lifting member associated with each working station and disposed beneath said second plane, and means interconnecting the drive beam and the lifting members to elevate the lifting members in accordance with movement of the drive beam in one direction to thereby lift the frames from the conveyor means to the working stations and to lower the lifting members in accordance with movement of the drive beam in the opposite direction to thereby lower the frames from the working stations after completion of the working operation and deposit the same on said conveyor means.

8. An assembly line for fabricating vehicle frames comprising, a series of work stations, a conveyor for supporting the frames in spaced relation and disposed in alignment beneath said series of work stations, drive means for moving the conveyor in increments between periods of dwell to successively position each of the frames beneath the work stations, a support member disposed in alignment with each work station, a rack, means interconnecting the rack and each support member, and second drive means operable in synchronization with said first drive means to move the rack in a reciprocating path with said rack being actuated substantially during the periods of dwell of said first drive means, said support members being elevated from a position beneath said conveyor in accordance with movement of the rack in one direction to thereby lift the frames from the conveyor to the corresponding work station and said support members being lowered in accordance with movement of said rack in the opposite direction to thereby lower the frames from the respective work stations and deposit the same on the conveyor.

9. An assembly line for fabricating vehicle frames comprising, a series of work stations, a pair of spaced transfer beams extending longitudinally beneath said series of stations and adapted to support the frames in spaced relation, said transfer beams having a forward and a return stroke substantially equal to the distance between said stations, a lifter member associated with each station and having a vertical stroke extending from a position beneath said transfer beams to a position in substantial alignment with the corresponding station, and drive means for driving the transfer beams and lifter members in synchronous cyclic movement with a cycle consisting of a forward stroke of the transfer beams to position the frames beneath said stations, an upward stroke of said lifter members to lift the frames from the transfer beams to the corresponding station, a return stroke of the transfer beams and a downward stroke of the lifter members to lower the frames from the respective stations and deposit the same back on the transfer beams.

10. An assembly line for fabricating vehicle frames comprising, a series of spaced work stations, a transfer beam extending longitudinally beneath said series of work stations and adapted to support the frames in spaced relation, drive means for moving the transfer beams in increments between periods of dwell to successively position each of the frames beneath the work stations, said transfer beam having a forward and a return stroke substantially equal to the distance between said stations, means associated with the drive means for augmenting the action of said drive means during the initial portion of the forward stroke of said beam and for dampening the action of said drive means during the latter portion of said forward stroke, and means associated with each work station for lifting the frame disposed on said transfer beam beneath the respective work station upwardly to the work station and for lowering the frame from the work station back onto the transfer beam after the working operation is completed.

11. An assembly line for fabricating vehicle frames comprising, a series of spaced work stations, a transfer beam extending longitudinally beneath said series of work stations and adapted to support the frames in spaced relation, drive means for moving the transfer beams in increments between periods of dwell to successively position each of the frames beneath the work stations, said transfer beam having a forward and a return stroke substantially equal to the distance between said stations, fluid cushioning means associated with an end of the transfer beam for cushioning the stopping movement of said beam, and fluid pressure means connected to the cushioning means and said beam for augmenting the starting movement of said beam.

12. An assembly line for fabricating vehicle frames comprising, a series of spaced work stations, a transfer beam extending longitudinally beneath said series of work stations and adapted to support the frames in spaced relation, drive means for moving the transfer beam in increments between periods of dwell to successively position each of the frames beneath the work stations, said transfer beam having a forward and a return stroke substantially equal to the distance between said stations, a hydraulic cylinder, a ram slidable within said cylinder, a lost motion connection connecting said transfer beam and said ram with movement of said beam in one direction effecting a corresponding movement of the ram within the cylinder only after said beam has moved through approximately the first half of the stroke thereof, and fluid control means associated with said cylinder for restricting the movement of ram within the cylinder during the second half of the stroke of the beam to thereby cushion the stopping movement of said beam.

13. An assembly line for fabricating vehicle frames comprising, a series of working stations disposed in a generally horizontal plane with adjacent stations in said series being spaced to provide an access area between each pair of adjacent stations, conveyor means disposed in a second plane parallel to said first-named plane for moving the frames in increments to successively position the frames in vertical alignment with said working stations, a drive beam disposed in a third plane parallel to said first-named plane and extending longitudinally of said series of working stations, drive means for moving the drive beam in a reciprocating path, a lifting member associated with each working station and disposed beneath said second plane, and means interconnecting the drive beam and the lifting members to elevate the lifting members in accordance with movement of the drive beam in one direction to thereby lift the frames from the conveyor means to the working stations and to lower the lifting members in accordance with movement of the drive beam in the opposite direction to thereby lower the frames from the working station after completion of the working operation and deposit the same on said conveyor means, a fluid cylinder, a ram slidably disposed within the cylinder and connected to the drive beam, a closed fluid system connecting the ends of said cylinder, a valve disposed in said system to control the flow of fluid therethrough, a cam connected to the drive beam, and a cam follower disposed to ride on said cam as the drive beam reciprocates and operably connected to the valve to actuate said valve and to control the flow of fluid through the system and thereby cushion the stopping motion of said drive beam.

14. An assembly line for fabricating vehicle frames comprising, a series of work stations disposed in a generally horizontal plane with adjacent stations in said series being spaced to provide an access area between each pair of adjacent stations, conveyor means disposed in a second plane parallel to said first-named plane and having a forward and return stroke for moving the frames in increments to successively position the frames in vertical alignment with said work stations, and means associated with each work station to move the frame aligned with said station vertically out of said second plane and into said work station whereat one of a series of operations is performed on the frame, and means for engaging said conveyor means at the end of both the forward and return stroke to positively stop the movement of said conveyor means and accurately align the frames carried by said conveyor means with the corresponding work stations.

15. An assembly line for fabricating vehicle frames comprising, a series of work stations, a pair of spaced transfer beams extending longitudinally beneath said series of stations and adapted to support the frames in spaced relation, drive means for moving the transfer beams in increments between periods of dwell to successively position each of the frames beneath the work stations, said transfer beams having a forward and a return stroke substantially equal to the distance between said stations, a lifter member associated with each station and having a vertical stroke extending from a position beneath said transfer beams to a position in substantial alignment with the corresponding station, second drive means synchronized with the first drive means for elevating the lifter members on substantial completion of the forward stroke of the transfer beams to lift the frames from the transfer beams to the corresponding station and for lowering the lifter members on substantial completion of the return stroke of the transfer beams to thereby lower the frames from the respective stations and deposit the same back on the transfer beams, and stop means actuated by movement of said second drive means for engaging said transfer beams at the end of both the forward and return stroke to positively stop said transfer beams and hold the same against movement during the elevating and lowering of said lifter members.

References Cited in the file of this patent
UNITED STATES PATENTS 2,401,592  Von Stocker _____ June 4, 1946